United States Patent
Moran et al.

(10) Patent No.: US 6,936,321 B2
(45) Date of Patent: Aug. 30, 2005

(54) BLOW MOLDED ARTICLE HAVING AN INTEGRALLY MOLDED LIVING HINGE AND METHOD OF MAKING THE SAME

(75) Inventors: Michael W. Moran, Highland, MI (US); Michael P. Schoemann, Waterford, MI (US); Anthony Spagnuolo, Windsor (CA); Timothy Noggle, Dover, PA (US)

(73) Assignee: Lear Corporation, Southfield, MI (US)

( * ) Notice: Subject to any disclaimer, the term of this patent is extended or adjusted under 35 U.S.C. 154(b) by 150 days.

(21) Appl. No.: 10/131,356

(22) Filed: Apr. 24, 2002

(65) Prior Publication Data
US 2003/0203150 A1 Oct. 30, 2003

(51) Int. Cl.[7] .................. B32B 3/00; B29C 47/00; B29C 45/14
(52) U.S. Cl. ............... 428/53; 428/54; 428/58; 428/95; 428/323; 428/325; 156/245; 264/516
(58) Field of Search .............. 156/245; 264/516; 428/95, 323, 325, 54, 58, 53

(56) References Cited

U.S. PATENT DOCUMENTS

| | | | |
|---|---|---|---|
| 4,563,381 A | | 1/1986 | Woodland |
| 4,636,065 A | | 1/1987 | Kanemitsu et al. |
| 4,877,672 A | * | 10/1989 | Shreiner ............ 428/156 |
| 4,885,820 A | | 12/1989 | Erceg et al. |
| 5,115,855 A | | 5/1992 | Lindblom et al. |
| 5,432,676 A | | 7/1995 | Satoh et al. |
| 5,463,794 A | | 11/1995 | Erland |
| 5,560,175 A | | 10/1996 | Soyka, Jr. et al. |
| 5,560,669 A | | 10/1996 | Gute |
| 5,762,852 A | | 6/1998 | Hettinga |
| 5,775,500 A | | 7/1998 | Williams |
| 5,842,730 A | | 12/1998 | Schneider et al. |
| 5,964,491 A | | 10/1999 | Marsh et al. |
| 6,136,259 A | | 10/2000 | Puffenberger et al. |
| 6,413,348 B2 | * | 7/2002 | Stancu et al. ............ 156/245 |
| 2002/0011695 A1 | * | 1/2002 | Stancu et al. ............ 264/516 |

FOREIGN PATENT DOCUMENTS

| | | |
|---|---|---|
| EP | 0 791 450 A1 | 8/1997 |
| GB | 1090846 | 11/1967 |
| GB | 1176813 | 1/1970 |
| WO | WO 94/12334 | 6/1994 |

* cited by examiner

*Primary Examiner*—Terrel Morris
*Assistant Examiner*—Victor S. Chang
(74) *Attorney, Agent, or Firm*—Brooks Kushman P.C.

(57) ABSTRACT

A blow molded structure comprising a body made out of a first polymeric material and an integrally molded, coextruded living hinge made out of a second, more flexible polymeric material. A method of making a blow molded article having a coextruded living hinge.

12 Claims, 3 Drawing Sheets

BLOW MOLDED ARTICLE HAVING AN INTEGRALLY MOLDED LIVING HINGE AND METHOD OF MAKING THE SAME

BACKGROUND OF THE INVENTION

1. Field of the Invention

This invention relates to a blow-molded structure having an integrally molded, coextruded living hinge and method of making the same.

2. Background Art

Vehicle panels, such as flipper panels, are commonly manufactured using a blow-molded machine. Blow-molding panels provide significant advantages over other manufacturing processes such as injection molding. For example, blow-molded parts are stronger, less expensive to manufacture, easier to design, and usually offer weight savings.

Some panels, such as seat flipper panels, carry significant loads and therefore must be manufactured out of a plastic material that has sufficient structural rigidity and strength. Typically, the panels are made out of a glass- or mineral-filled polymer. In particular, the panels are made out of a glass-filled polypropylene material.

However, some panels, such as vehicle flipper panels, are also subject to repeated cyclic loading. Although the flipper panels are generally manufactured out of a glass-filled, polypropylene material that is rigid and provides sufficient structural qualities, the repeated cyclic loading of the panel causes the glass-filled polypropylene material to fracture resulting in a part that can no perform to the original specification.

Accordingly, manufacturers of flipper panels have resorted to using a subsequent manufacturing step wherein a portion of the flipper panel is modified and a metal hinge is attached thereto. This extra step adds time and money, and creates manufacturing difficulties.

Accordingly, there exists a need for a cost effective and easily manufactured blow-molded structure having a structurally rigid, load bearing portion and a flexible portion to perform product specified cyclic functions.

SUMMARY OF THE INVENTION

Accordingly, the present invention provides a cost effective and easily manufactured blow molded structure having a structurally rigid, load bearing portion and a flexible portion.

The present invention also provides a blow molded structure and a method of making a blow-molded structure wherein the blow molded structure has an integrally molded, coextruded living hinge.

According to the present invention, a blow-molded structure comprising a body made out of a first polymeric material and an integrally molded coextruded living hinge made out of a second, more flexible polymeric material is provided. Preferably, the first polymeric material is a glass-filled, polypropylene material and a second polymeric material is an unfilled polypropylene.

According to another embodiment of the present invention, a carpet pad or decorative laminate is secured or bonded to the body to provide an aesthetic appearance.

Also according to the present invention, a method of forming a blow-molded article having a coextruded living hinge is provided. The method comprises providing a blow-mold machine having a multiple extrusion head and a blow mold. A parison having a first material and a second, more flexible longitudinal strip of material is coextruded. A mold comprising two mold halves is closed about the parison and the article is cooled within the mold. The mold is then opened and the article removed therefrom.

Preferably, the first material is a glass-filled polypropylene material of sufficient strength and rigidity and the second material is a more flexible, non-glass-filled, polypropylene material capable of withstanding repeated cyclic loading.

According to another embodiment of this invention, the blow mold has at least one cavity and the method of performing a blow-molded article comprises the further step of applying a carpet pad or a decorative laminate to the cavity of the mold before the mold closes on the parison.

The above features, and other features and advantages of the present invention are readily apparent from the following detailed descriptions thereof when taken in connection with the accompanying drawings.

DETAILED DESCRIPTION OF THE PREFERRED EMBODIMENTS

As previously described, the prior art flipper panels require the additional steps of modifying sections of the flipper pan and inserting a metal hinge to the flipper panel thereby increasing the cost and time to manufacture a completed part. As a result, there exists a need for a cost effective and easily manufactured blow-molded structure having a structurally rigid, load bearing portion and a flexible portion.

Figure 1:
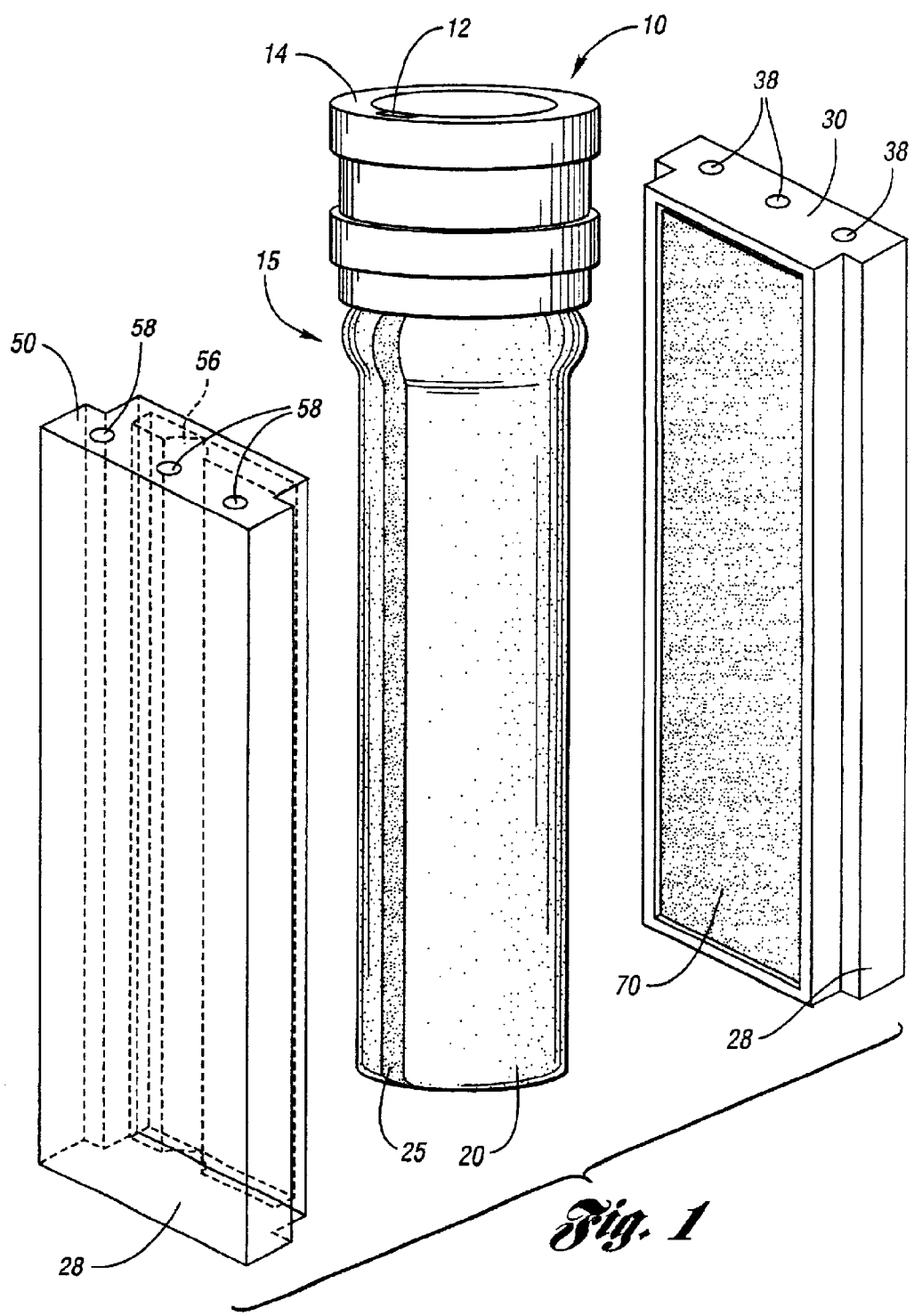
FIG. 1 is a perspective view of the coextruded parison of the present invention.

Referring now to FIG. 1, a blow molding multiple extrusion head 10 is part of a larger blow-molding machine (not shown). The multiple extrusion head comprises multiple ports for coextruding material. A majority of the multiple extrusion head comprises of first port 14 and a smaller portion comprises living hinge port 12. Heated plastic material is extruded through the ports 12 and 14 in a known manner to form a parison 15 that extends below the blow-mold multiple extrusion head 10.

Figure 3:
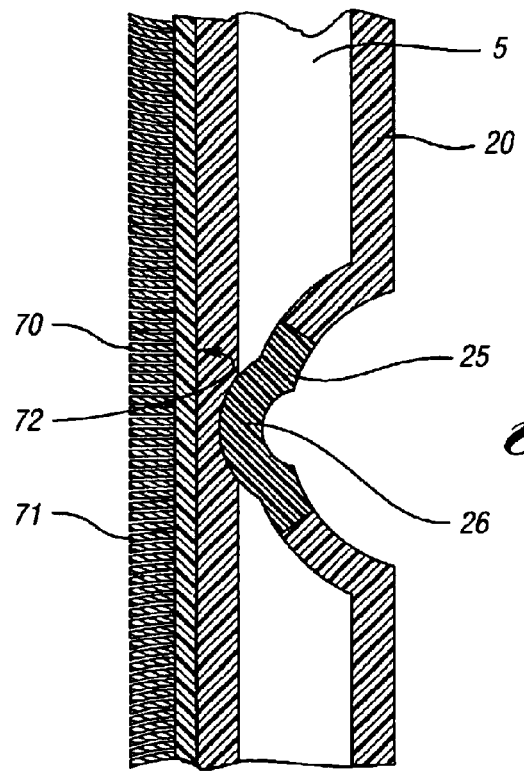
FIG. 3 is a detail of an article made by the present invention detailing the living hinge.

The parison 15 comprises two polymeric materials. The first polymeric material 20 is extruded through the port 14 and provides structure and rigidity to the finished part 5 shown in FIG. 3. Preferably, the first material 20 is a filled polypropylene material. More preferably, the first material 20 is a glass-filled polypropylene material. Alternatively, the first material 20 may be a mineral-filled polypropylene material. One skilled in the art however could blow mold a part using a variety of materials, both filled and non-filled, to suit the structural requirements of the completed part 5.

A second material 25 is coextruded along with the first material 20 and is a more flexible polymeric material. The second material 25 is extruded through the port 12. Whereas, the first material 20 is a glass-filled material to provided structural rigidity, the second material 25 is a non-glass filled to allow for flexibility. Preferably, the second material 25 is a polypropylene material. Similarly, one skilled in the art could blow mold a part using a variety of polymeric materials.

Figure 2:
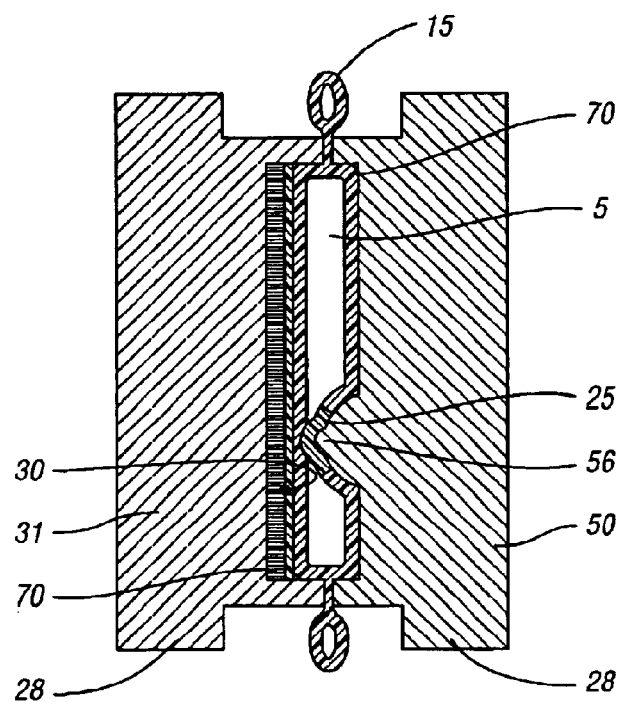
FIG. 2 is a cross-sectional view of the blow mold closed about the parison of the present invention.

The blow mold 28 comprises at least a first blow mold half 30 and a second blow mold half 50. After the heated parison 15 is extruded from the blow mold head 15, the blow mold halves 30, 50 close about the parison while it is still pliable. The parison 15 is then blown against the mold halves 30, 50 in a known manner. When the mold halves 30, 50 close about the parison 15, a protrusion 56 contacts the second material 25 to push it towards first mold half 30 as shown in FIG. 2 to form a living hinge. When force is applied to the finished part 5, the part can bend and flex about living hinge 26 without fracture. The living hinge 26 is made out of a more flexible material than the rest of the completed part 25. Of course, multiple living hinges can be molded into the part by having multiple extrusion ports 12 coextruding more flexible material 20.

First mold half 30 may have cooling lines 38 through which water is circulated to facilitate cooling the parison. Similarly, second mold half 50 may also have cooling lines 58 which circulate a cooling fluid. Cooling the parison 15 results in shorter cycle times and increased output.

Additionally, the part 5 may be molded with an integral carpet pad or decorative laminate 70. A carpet pad or decorative laminate 70 is placed on inner cavity wall 31 of mold half 30 such that the decorative side 71 of the carpet pad or decorative laminate is facing the inner cavity wall. When the mold halves 30, 50 close about the heated parison 15, the heated parison contacts the backside 72 of the carpet pad or decorative layer and causes the carpet pad or decorative layer to stick or bond to the surface of the heated parison. Although only one carpet pad or decorative layer is illustrated, one skilled in the art could devise a mold 28 having more than one carpet pad or decorative layer. The decorative layer may have a wood grain finish or a metallic surface.

Figure 4:
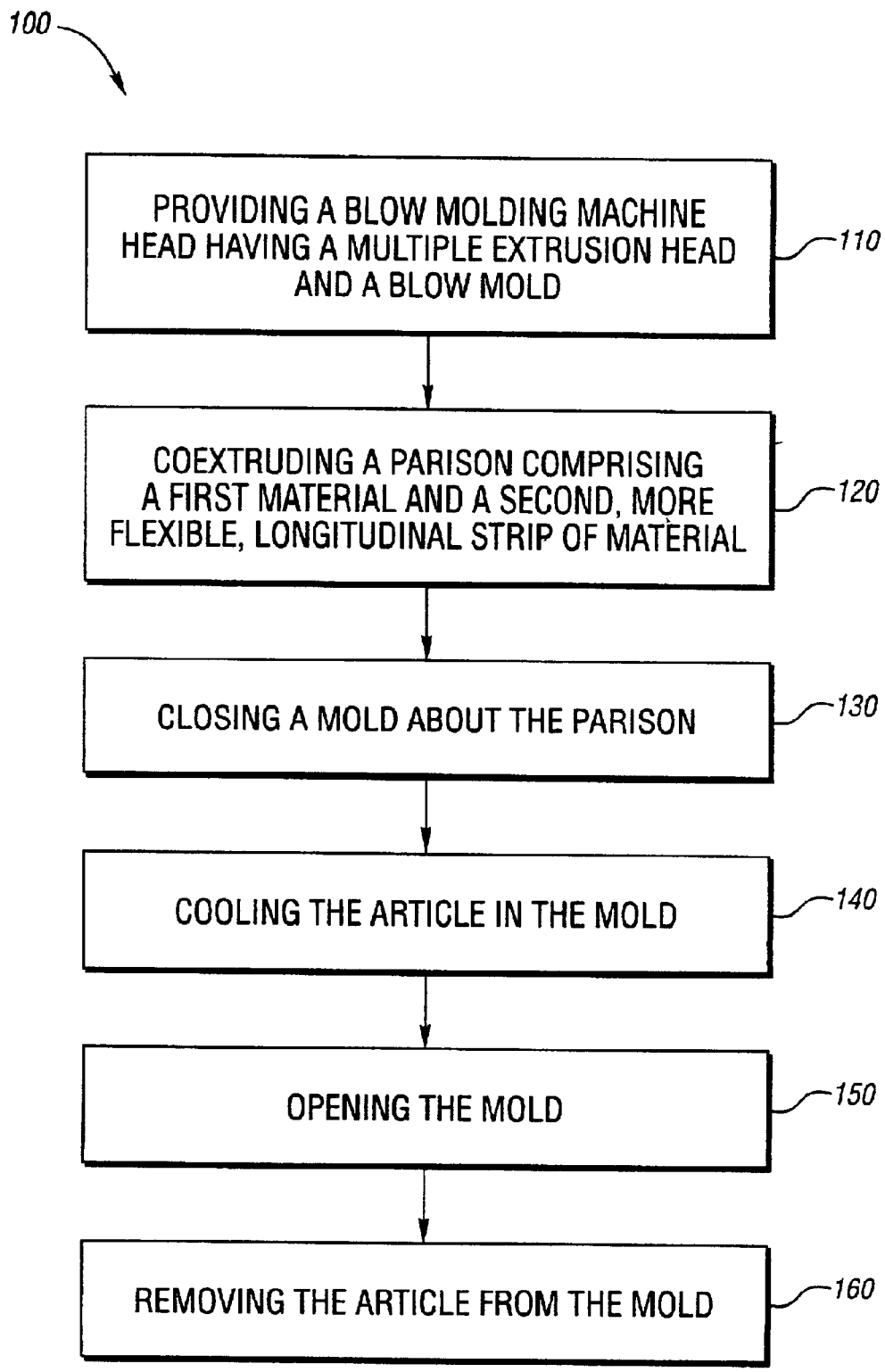
FIG. 4 is a flow chart of a method of making the coextruded article according to the present invention.

The present invention also discloses a method of making a blow molded article having a coextruded living hinge. Referring now to FIG. 4, the method is generally shown, denoted as 100. The method 100 comprises a first step 110 of providing a blow-mold machine having a multiple extrusion head and a blow mold. The next step 120 comprises coextruding a parison comprising a first material and a second, more flexible material. Step 130 comprises closing the mold about the parison. The next step 140 comprises cooling the article in the mold. Next, step 150 involves opening the mold. Lastly, step 160 includes removing the article from the mold.

As previously discussed, the first material can be any polymeric material of sufficient rigidity and strength. Preferably, the first material will be a glass- or mineral-filled polypropylene material. Similarly, the second material will be a more flexible polymeric material. Preferably, the second material will be polypropylene.

The blow mold may also have at least one cavity and the method 100 may also comprise an additional step of applying a carpet pad or decorative layer to the at least cavity of the mold before the mold closes on the parison to bond the carpet to the parison.

Although the invention refers to flipper pans, any article that requires a stiff structural portion and a more flexible portion can be made according to the present invention. For example, door trim panels generally require a stiff structure but may also require a more flexible hinge portion proximate an arm rest on the door trim panel.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A blow molded structure comprising:
   a body made out of a first polymeric material having a first and second body portion and a living hinge made out of a second, more flexible polymeric material than the first material, the hinge being disposed between the body portions, such that the first and second portions are disposed on and contacting laterally spaced sides of the living hinge.

2. The blow molded structure of claim 1 wherein the first polymeric material is a glass-filled thermoplastic material.

3. The blow molded structure of claim 1 wherein the first polymeric material is a glass-filled polypropylene material.

4. The blow molded structure of claim 1 wherein the second polymeric material is polypropylene.

5. The blow molded structure of claim 1 further comprising a carpet pad secured to the body.

6. The blow molded structure of claim 1 wherein the first polymeric material is a mineral-filled thermoplastic material.

7. The blow-molded structure of claim 1 further comprising a decorative laminate secured to the body.

8. A blow molded structure comprising:
   a body made out of a first polymeric material and an integrally molded, coextruded living hinge made out of a second, more flexible polymeric material, wherein the body has portions contacting opposing sides of the living hinge, and the body has portions disposed on three sides of the living hinge.

9. The blow molded structure of claim 8 wherein the body has a first side and a second side, the living hinge being disposed between the first and second sides, the body having extension portions extending between and connecting the first side with the living hinge.

10. A blow molded structure comprising:
    a body made out of a first polymeric material, the body having a first side and a spaced apart second side; and
    an integrally molded, coextruded living hinge made out of a second, more flexible polymeric material, the living hinge being disposed between the first and second sides, wherein the body has first and second portions disposed on and contacting laterally spaced sides of the living hinge.

11. The blow molded structure of claim 10 wherein the body has portions disposed on three sides of the living hinge.

12. The blow molded structure of claim 11 wherein the first portions include extension portions extending between and connecting the first side and the living hinge, the extension portions extending from the first side towards the second side.

\* \* \* \* \*